United States Patent
Gorenflo et al.

(10) Patent No.: US 10,888,046 B2
(45) Date of Patent: Jan. 12, 2021

(54) METHOD FOR OPERATING AN AUTONOMOUS MOBILE LAWN MOWER ROBOT AND LAWN MOWING SYSTEM

(71) Applicant: Andreas Stihl AG & Co. KG, Waiblingen (DE)

(72) Inventors: Ernst Gorenflo, Bad Rappenau (DE); Peter Ritzer, Ebbs (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 185 days.

(21) Appl. No.: 16/003,694

(22) Filed: Jun. 8, 2018

(65) Prior Publication Data
US 2018/0352730 A1    Dec. 13, 2018

(30) Foreign Application Priority Data
Jun. 9, 2017   (EP) ..................... 17175381

(51) Int. Cl.
*A01D 34/00*      (2006.01)
*A01D 34/74*      (2006.01)
*A01D 34/78*      (2006.01)
*A01D 101/00*     (2006.01)

(52) U.S. Cl.
CPC ........... *A01D 34/008* (2013.01); *A01D 34/74* (2013.01); *A01D 34/78* (2013.01); *A01D 2101/00* (2013.01)

(58) Field of Classification Search
CPC .... A01D 34/006; A01D 34/008; A01D 34/54; A01D 34/74; A01D 34/78
See application file for complete search history.

(56) References Cited

U.S. PATENT DOCUMENTS

| | | | | |
|---|---|---|---|---|
| 3,217,479 A * | 11/1965 | Robinson | ............... | A01D 34/54 56/254 |
| 4,321,784 A * | 3/1982 | Wood | .................... | A01D 34/74 280/43.13 |
| 5,031,335 A * | 7/1991 | Kimmelman | .......... | A01D 34/54 33/613 |
| 2011/0166701 A1* | 7/2011 | Thacher | ............... | A01D 34/008 700/245 |
| 2013/0047565 A1* | 2/2013 | Shida | .................... | A01D 34/44 56/10.2 H |
| 2017/0020064 A1 | 1/2017 | Doughty et al. | | |
| 2017/0280623 A1* | 10/2017 | Yamamura | ............. | A01D 69/02 |

FOREIGN PATENT DOCUMENTS

| | | |
|---|---|---|
| DE | 10 2010 044 275 A1 | 3/2012 |
| EP | 2 342 964 B1 | 10/2012 |
| EP | 2 767 150 A1 | 8/2014 |
| EP | 3 106 013 A1 | 12/2016 |
| WO | WO 2016/108104 A1 | 7/2016 |

* cited by examiner

*Primary Examiner* — Alicia Torres
(74) *Attorney, Agent, or Firm* — Crowell & Moring LLP

(57) ABSTRACT

A method for operating an autonomous mobile lawn mower robot having a cutting tool for mowing a lawn, wherein a cutting height of the cutting tool is adjustable, includes the steps of: receiving a prediction of an environmental condition describing parameter, and automatically adjusting the cutting height of the cutting tool as a function of the received prediction.

16 Claims, 1 Drawing Sheet

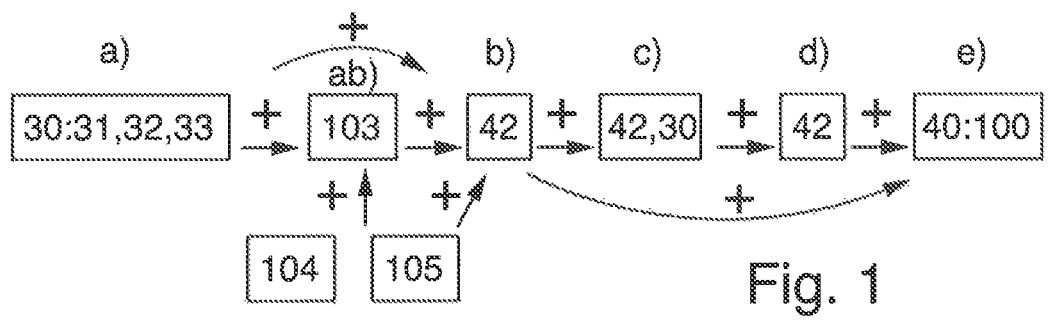
Fig. 1
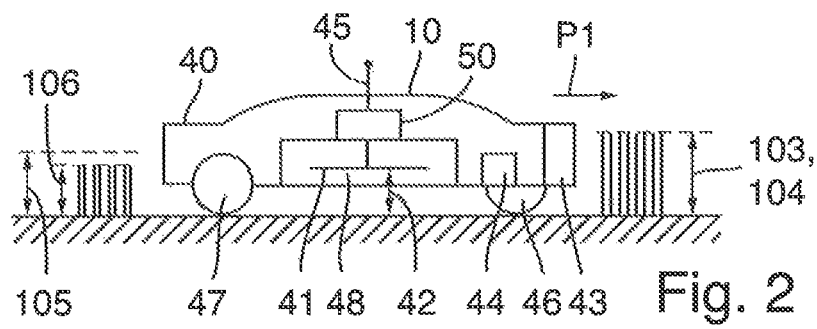
Fig. 2
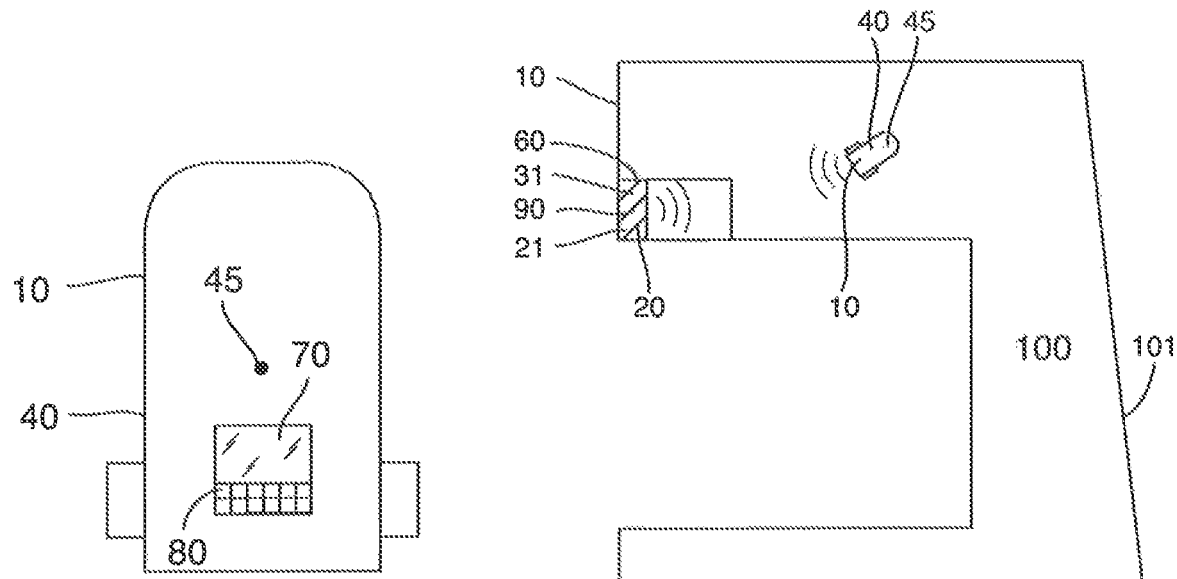
Fig. 3
Fig. 4

METHOD FOR OPERATING AN AUTONOMOUS MOBILE LAWN MOWER ROBOT AND LAWN MOWING SYSTEM

CROSS REFERENCE TO RELATED APPLICATIONS

This application claims priority under 35 U.S.C. § 119 from European Patent Application No. 17 175 381.7, filed Jun. 9, 2017, the entire disclosure of which is herein expressly incorporated by reference.

BACKGROUND AND SUMMARY OF THE INVENTION

The invention relates to a method for operating an autonomous mobile lawn mower robot and a lawn mowing system having such an autonomous mobile lawn mower robot.

A lawn mower robot having a cutting tool whose cutting height is adjustable is known.

The invention is based on the problem of making available a method for operating an autonomous mobile lawn mower robot and of making available a lawn mowing system having such an autonomous mobile lawn mowing robot, wherein the method and the lawn mowing system have improved properties and/or improved functionalities.

The invention solves the problem by providing a method for operating an autonomous mobile lawn mower robot and a lawn mowing system, in accordance with claimed embodiments of the invention. Advantageous developments and/or refinements of the invention are described and claimed herein.

The method according to the invention for operating an autonomous mobile lawn mower robot having a cutting tool for mowing a lawn, wherein a cutting height of the cutting tool can be set and/or adjusted, has the steps: a) receiving, in particular automatically receiving, a prediction and/or forecast of an environmental condition describing parameter, and b) automatically setting the cutting height of the cutting tool as a function of the received prediction.

The method permits the cutting height of the cutting tool already to be set as a function of the received prediction before the occurrence of a future environmental condition which is described with the environmental condition describing parameter. The method can permit an effect of the future environmental condition on the lawn already to be taken into account in the present and to be optionally compensated in that the cutting height of the cutting tool is set as a function of the received prediction of the environmental condition describing parameter.

The lawn can be referred to as a grass area and/or meadow.

The autonomous mobile lawn mower robot can be configured to move and/or to act self-actingly, automatically, in a self-determined fashion, in a self-controlled fashion and/or independently of a user on the lawn which is to be treated and which can be predefined and/or limited, and/or in its surroundings, and/or select at least one parameter such as, in particular, a route parameter and/or a reversal point. The autonomous mobile lawn mower robot can additionally or alternatively be configured to begin the mowing and/or end the mowing independently. The autonomous mobile lawn mower robot does not need to be controlled by the user, in particular does not need to be remote-controlled. In other words, the autonomous mobile lawn mower robot can mow, in particular, without human control and/or guidance. The autonomous mobile lawn mower robot can be referred to as a service robot and/or service-providing robot and/or garden implement.

The cutting tool can advantageously be configured to mow and/or cut grass, herbaceous plants, woody undergrowth or relatively small shrubs. In particular the cutting tool can be a rotating cutting tool and can be configured to mow the material to be mown in the so-called free-cutting state without an opposing cutter. The cutting tool can advantageously comprise at least one trimmer line, at least one plastic blade, at least one metal blade and/or a metal cutting blade with at least one cutting edge and/or at least one cutting tooth.

The cutting height of the cutting tool can be a vertical and/or perpendicular distance between an underlying surface on which the autonomous mobile lawn mower robot can move and the cutting tool, in particular a cutting plane which is defined by the cutting tool. The autonomous mobile lawn mower robot can advantageously have running wheels for moving on the underlying surface, and the cutting height can be a vertical distance between the running wheels and the cutting tool. In particular, the cutting height can be in a range between 0 centimetres (cm) to 50 cm, in particular to 15 cm, in particular in a range from 2 cm to 10 cm. The cutting height of the cutting tool can be adjustable in an infinitely adjustable fashion or in relatively small steps, in particular in 0.5 cm steps.

The environmental condition describing parameter can advantageously be a parameter which is relevant for the lawn, in particular the growth thereof. The growth of the lawn can be influenced by and/or dependent on the environmental condition.

The reception of a prediction can comprise retrieving the prediction via a network, in particular via a data network such as the Internet. The prediction can be a future prediction for the next hours or days, in particular for the coming three to five days. The reception can advantageously take place repeatedly at regular time intervals.

Automatic adjustment of the cutting height of the cutting tool can mean that the cutting height of the cutting tool can be adjusted without human intervention.

Step b) can be carried out simultaneously with step a) and/or chronologically after it.

The adjustment of the cutting height of the cutting tool as a function of the received prediction of the environmental condition describing parameter can be such that if the prediction permits future increased lawn growth to be expected, a relatively low cutting height is set, or if the prediction permits future relatively low lawn growth to be expected, a relatively high cutting height is set.

In one development of the invention the environmental condition describing parameter comprises a meteorological condition, in particular an air temperature, an air humidity, a dew point, an air pressure, an air density, an air composition, a wind direction, a wind velocity, a type of precipitation, an amount of precipitation, a cloudiness level, a visibility, a global radiation level, an albedo and/or a season of the year. The prediction can be referred to as a weather forecast. Additionally or alternatively, the environmental condition describing parameter can comprise a parameter which describes the condition of the soil, in particular moisture of the soil, composition of the soil, temperature of the soil, a soil pH value and/or soil fertilizer condition.

In one development of the invention, the method has a step: receiving, in particular automatically receiving, a past value of the environmental condition describing parameter and/or a present value of the environmental condition describing parameter. At the same time and/or chronologically after this, step b) comprises: automatic adjusting of the cutting height of the cutting tool as a function of the received past value and/or of the received present value. Taking into account the past value and/or the present value of the environmental condition describing parameter makes it possible to estimate the future lawn growth relatively precisely and/or to adjust the cutting height of the cutting tool relatively better.

In one development of the invention, the method comprises a step ab): obtaining, in particular automatically obtaining, a future lawn height of the lawn based on the environmental condition describing parameter using a lawn growth model. Simultaneously and/or chronologically after this, step b) comprises: automatic adjusting of the cutting height of the cutting tool as a function of the obtained future lawn height. The future lawn height can be a lawn height which the lawn can be expected to reach in the coming three or five days. The obtaining process can comprise determining and/or calculating. In particular, the lawn growth model can comprise a table, a mathematical formula, an estimate which is based on imperial values and/or a simulation. The environmental condition describing parameter can be referred to as an input variable of the lawn growth model and/or the future lawn height can be referred to as an output variable of the lawn growth model. Advantageously the effect of the environmental condition describing parameter on the lawn or its lawn height can be determined relatively precisely by means of the lawn growth model. Precisely obtaining the future lawn height or a gain in lawn height is advantageous for the adjustment of the cutting height.

In one refinement of the invention, the method comprises a step: identifying, in particular automatically identifying, a present lawn height of the lawn. When the method is next carried out, the future lawn height of the lawn is obtained using the lawn growth model based on the identified present lawn height. This can constitute a type of feedback for improving the lawn growth model. The identification of the present lawn height of the lawn can be carried out by means of a sensor, in particular by means of a lawn height sensor, which the autonomous mobile lawn mower robot can advantageously comprise. Additionally or alternatively, the identification of the present lawn height of the lawn can be carried out using a measurement of the current power consumption of a drive motor of the cutting tool during the mowing, wherein the present lawn height can be obtained from the power consumption. The identification of the present lawn height of the lawn can also additionally or alternatively take place visually, in particular by means of a camera, which the autonomous mobile lawn mower robot can advantageously incorporate.

In one development of the invention, the method has a step c): outputting the adjusted cutting height of the cutting tool and/or the environmental condition describing parameter. This can permit the user to control and/or monitor and/or check the method. The outputting can take place acoustically, haptically and/or visually. The step c) can be carried out simultaneously with the step b) and/or chronologically after it.

In one development of the invention, the method has a step d): enabling the adjusted cutting height of the cutting tool for processing and/or correcting and/or adjusting. The step d) can be carried out simultaneously with the step b) and/or chronologically after it.

In one development of the invention, the method comprises a step e): mowing, in particular autonomous mowing, of the lawn using the autonomous mobile lawn mower robot having its cutting tool adjusted in cutting height. The mowing of the lawn can advantageously take place chronologically immediately after the automatic adjustment of the cutting height and/or before the occurrence of the time of the prediction. The mowing of the lawn can be defined and/or planned using a mowing schedule, in particular mowing can be carried out at regular time intervals. The mowing schedule can provide a pause without mowing at certain hours of a day, in particular during a sleeping time and/or during a time of mid-day rest. The lawn height after the mowing can advantageously correspond to the adjusted cutting height. The mowing schedule can be adapted and/or modified as a function of the prediction. The step e) can be carried out simultaneously with the step b) and/or chronologically after it.

In one embodiment of the invention, in particular in the case of a relatively high present lawn height of the lawn, the cutting height of the cutting tool can be adjusted for a relatively high setting at first, or in a first step or a first stage, and the lawn can be mown using the lawn mower robot with its cutting tool at a relatively high setting. In a second step or second stage or chronologically after this, the cutting height of the cutting tool can be adjusted to a relatively low setting, in particular to a desired height, and the lawn can be mown using the lawn mower robot with its cutting tool adjusted for a relatively low setting. This method can optionally be continued with at least one further step or a further stage, in particular until the desired height is reached. This multi-stage adjustment of the cutting height makes it possible to prevent relatively long stalks of grass remaining on the lawn or the surface. This can be referred to as a high grass mowing function. The relatively high present lawn height can be identified, in particular as described above. In particular, various lawn heights can be identified in various areas or sections of the lawn, and the cutting height adjustment can be carried out in various numbers in stages for the various areas. In particular, the lawn mower robot and/or a lawn mowing system can have at least one position-determining device for determining the position of the lawn mower robot on the lawn or its areas. Additionally or alternatively, a time period since the lawn was last mown can be identified, and when the time period is reached and/or exceeded by a time period limit it is possible to assume that the present lawn height is relatively high. For example in the case of a relatively long down time owing to a service and/or a defect of the lawn mower robot. It is also additionally or alternatively possible for a present point in time, in particular a day, a week and/or a month to be identified, and when the point in time lies within a specific time window it can be assumed that the present lawn height is relatively high. For example at the start of the year.

In one development of the invention, the method has a step: predefining an average lawn height of the lawn. Simultaneously and/or chronologically after this, the step b) comprises: automatically adjusting the cutting height of the cutting tool as a function of the predefined average lawn height. The average lawn height of the lawn can be a lawn height which the user desires when averaged over time.

The invention furthermore relates to a lawn mowing system, in particular for carrying out the method described above. The lawn mowing system according to the invention has a receiver unit, the autonomous mobile lawn mower robot and a height adjustment device. The receiver unit is configured to receive and/or retrieve the prediction of the environmental condition describing parameter. The autonomous mobile lawn mower robot has the cutting tool for mowing the lawn, wherein the cutting height of the cutting tool is adjustable. The height adjusting device is configured to interact with the receiver unit and to adjust the cutting height of the cutting tool automatically as a function of the received prediction.

The lawn mowing system permits the cutting height of the cutting tool already to be adjusted as a function of the received prediction before a future environmental condition occurs. The lawn mowing system can permit an effect of the future environmental condition on the lawn already to be taken into account in the present and optionally to be compensated by adjusting the cutting height of the cutting tool as a function of the received prediction of the environmental condition describing parameter.

The cutting height of the cutting tool can advantageously be adjustable in an infinitely variable fashion or in relatively small steps, in particular in 0.5 cm steps. The receiver unit can be configured to receive and/or retrieve the past value of the environmental condition describing parameter and/or the present value of the environmental condition describing parameter. The height adjusting device can be configured to automatically adjust the cutting height of the cutting tool as a function of the received past value and/or received present value. In particular, the autonomous mobile lawn mower robot can comprise the receiver unit and/or the height adjusting device.

In one development of the invention the lawn mowing system has a computing unit. The computing unit is configured to obtain the future lawn height of the lawn based on the environmental condition describing parameter using the lawn growth model. The height adjusting device is configured to adjust the cutting height of the cutting tool automatically as a function of the obtained future lawn height. The computing unit can advantageously be a computer, a smart phone, a tablet and/or a microchip. The autonomous mobile lawn mower robot can comprise the computing unit. In particular, the height adjusting device can be configured to interact with the computing unit.

In one development of the invention the lawn mowing system has an output device. The output device is configured to output the adjusted cutting height of the cutting tool and/or the environmental condition describing parameter. The output device can advantageously comprise a loudspeaker and/or a screen. In particular, the autonomous mobile lawn mower robot can comprise the output device.

In one development of the invention, the lawn mowing system has an input device. The input device is designed to process and/or correct and/or adjust the adjusted cutting height of the cutting tool. The input device can advantageously comprise a gesture detection system, a voice recognition system and/or a keypad. In particular, the output device and the input device can be configured to be connected to one another, in particular can comprise a common touch screen. The processing of the adjusted cutting height can be carried out by a user using the input device. In particular the height adjusting device can be designed to interact with the input device. Additionally or alternatively, the input device can be designed to predefine the average lawn height of the lawn. The height adjusting device can be designed to set the cutting height of the cutting tool automatically as a function of the predefined average lawn height.

In one development of the invention, the receiver unit has an interface for connecting the receiver unit to a network, in particular to a data network such as the Internet. The interface can advantageously be configured to set up a data connection to a service which makes available the environmental condition describing parameter. The interface can be a data interface, in particular a UMTS, WLAN and/or Bluetooth Interface.

In one development of the invention, the cutting height of the cutting tool is adjustable in a range from 0 to 50 cm, in particular to 15 cm, in particular in a range from 2 to 10 cm.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a flow chart of an exemplary method according to the invention.

FIG. 2 shows a partially sectional side view of an autonomous mobile lawn mower robot of a lawn mowing system according to an embodiment of the invention.

FIG. 3 shows a plan view of the lawn mower robot in FIG. 2.

FIG. 4 shows a plan view of an area to be treated by means of the lawn mowing system according to an embodiment of the invention.

DETAILED DESCRIPTION OF THE DRAWINGS

FIGS. 2 to 4 show a lawn mowing system 10 having a receiver unit 20, an autonomous mobile lawn mower robot 40 and a height adjusting device 50. The receiver unit 20 is designed to receive a prediction 31 of an environmental condition describing parameter 30. The lawn mower robot 40 has a cutting tool 41 for mowing a lawn 100 wherein a cutting height 42 of the cutting tool 41 is adjustable, as can be seen in FIG. 2. The height adjusting device 50 is configured to interact with the receiver unit 20 and to adjust the cutting height 42 automatically as a function of the received prediction 31. In the exemplary embodiment shown, the lawn mower robot 40 comprises the height adjusting device 50. In alternative exemplary embodiments, the height adjusting device can be embodied separately from the lawn mower robot and can be arranged anywhere on the lawn or by the lawn. The lawn mower robot can move or relocate towards the height adjusting device in order to adjust the cutting height of its cutting tool.

The lawn mowing system 10 permits the cutting height 42 of the cutting tool 41 already to be adjusted as a function of the received prediction 31 before a future environmental condition occurs and already to take into account and compensate for an effect of the future environmental condition on the lawn 100.

The lawn mowing system 10 is configured to carry out a method which is shown in FIG. 1, or the method is configured to operate the autonomous mobile lawn mower robot 40 with its cutting-height-adjustable cutting tool 41. The method has the steps: a) receiving the prediction 31 of the environmental condition describing parameter 30, and b) automatically adjusting the cutting height 42 of the cutting tool 41 as a function of the received prediction 31.

The method permits the cutting height 42 of the cutting tool 41 already to be adjusted before the occurrence of the future environmental condition as a function of the received prediction 31, and an effect of the future environmental condition on the lawn 100 already to be taken into account and compensated in the present.

In detail, the autonomous mobile lawn mower robot 40 has front running wheels 46 which are pivotable and rear running wheels 47 which are driven separately from one another. The lawn mower robot 40 can therefore move and steer independently on the lawn 100. The lawn mower robot 40 also has an electric motor (not illustrated) for driving the cutting tool 41. In alternative exemplary embodiments, the lawn mower robot can have an internal combustion engine, in particular a gasoline engine, for driving the cutting tool. In addition, the lawn mower robot 40 has an accumulator (not illustrated) for supplying drive energy to the rear wheels 47 and the electric motor for driving the cutting tool 41. In alternative exemplary embodiments, the lawn mower robot can have a fuel cell or another type of drive energy source for supplying drive energy.

In the exemplary embodiment shown, the cutting tool 41 comprises a metal cutting blade with three cutting teeth. In alternative exemplary embodiments, the cutting tool can comprise just a single cutting tooth or two or more than three cutting teeth. The cutting tool 41 is embodied as a rotating cutting tool and is configured to treat the lawn 100 in the free cutting method, in particular to generate a cutting process by means of centrifugal force of the cutting tool 41. In particular, the lawn mower robot 40 is embodied as a mulch mowing robot.

The rotating cutting tool 41 defines a cutting plane 48 which runs parallel to an underlying surface on which the lawn mower robot 40 moves. The cutting height 42 of the cutting tool 41 is a vertical or perpendicular distance between the cutting plane 48 and the underlying surface or a running plane which is defined by the running wheels 46, 47. In detail, the cutting height 42 is infinitely adjustable in a range from 2 cm to 10 cm.

In the exemplary embodiment shown, the environmental condition describing parameter 30 comprises a meteorological parameter, in particular rain and sunshine, and therefore describes environmental conditions which are relevant for the growth of the lawn 100. The prediction 31 can be referred to as a weather forecast. The prediction predicts the environmental condition 24 hours in advance and in turn describes a time period of 24 hours. The receiver unit 20 is configured to retrieve the prediction 31 of the environmental condition describing parameter 30 automatically from the Internet on an hourly basis. In other words, the step a) is repeated hourly. There is therefore sufficient time to react to the prediction, in particular in step b) to adjust the cutting height 42 automatically as a function of the received prediction 31, in particular by means of the height adjusting device 50. In detail the receiver unit 20 has an interface 21 in the form of a UMTS interface for connecting the receiver unit 20 to the Internet and for setting up a data connection to a weather service.

The adjustment of the cutting height 42 of the cutting tool 41 as a function of the received prediction 31 of the environmental condition describing parameter 30 is as follows: if rain is predicted it is assumed that the lawn 100 is in the rain and after the rain will not dry out in the sunshine but rather grow to a greater extent. For this reason, when there is a prediction of rain the cutting height 42 is automatically adjusted to a relatively low setting, and before the rain the lawn 100 is mown using the autonomous mobile lawn mower robot 40 with its cutting tool 41 adjusted to a low setting, in a step e) of the method, as can be seen in FIGS. 1, 2 and 4. If sunshine is predicted, the lawn 100 must be protected against drying out. Therefore, when sunshine is predicted, the cutting height 42 is automatically adjusted to a relatively high setting, and the lawn 100 is mown using the lawn mower robot 40 with its cutting tool 41 adjusted to a high setting, in step e). In FIG. 2 the lawn mower robot 40 is moving from left to right, as indicated by the arrow P1. After the mowing, a lawn height 106 of the lawn 100 corresponds to the adjusted cutting height 42, as can be seen on the left in FIG. 2.

In addition, in step a) a present value 32 and a past value 33 of the environmental condition describing parameter 30 are received, in particular using the receiver unit 20. In addition, in step b) during the automatic adjustment of the cutting height 42 of the cutting tool 41 the present value 32 and the past value 33 of the environmental condition describing parameter 30 are taken into account, in particular by means of the height adjusting device 50. If sunshine is predicted and the sun is currently shining, there is a relatively high risk that the lawn 100 will dry out. It can less probably be assumed that the lawn 100 will grow to a greater extent. In this case, the cutting height 42 is automatically adjusted to a relatively high setting. If sunshine is predicted and it is currently raining, the risk of drying out is relatively low. It can rather be assumed that the lawn 100 will firstly grow in the sunshine after the rain. In this case, the cutting height 42 is automatically not adjusted to quite such a high setting.

Furthermore, the lawn mowing system 10 has a computing unit 60. The computing unit 60 is configured to obtain automatically a future lawn height 103 of the lawn 100 based on the environmental condition describing parameter 30 using a lawn growth model. The height adjusting device 50 is configured to adjust the cutting height 42 of the cutting tool 41 automatically as a function of the obtained future lawn height 103. The height adjusting device 50 is configured to interact with the computing unit 60. The receiver unit 20 is configured to interact with the computing unit 60.

The future lawn height 103 is a lawn height which the lawn 100 will be expected to reach in the coming three or five days.

Correspondingly, the method has a step ab): automatic obtaining of the future lawn height 103 of the lawn 100 based on the environmental condition describing parameter 30 using the lawn growth model. The step b) comprises: automatically adjusting the cutting height 42 of the cutting tool 41 as a function of the obtained future lawn height 103.

Furthermore, the lawn mowing system 10, in particular the lawn mower robot 40 thereof, has a lawn height sensor 43, as can be seen on the right in FIG. 2. The lawn height sensor 43 is configured to automatically identify a present lawn height 104 of the lawn 100. The computing unit 60 is configured to obtain automatically, when the method is next carried out, the future lawn height 103 of the lawn 100 using the lawn growth model based on the identified present lawn height 104. The lawn height sensor 43 is configured to interact with the computing unit 60.

Accordingly, the method has a step: automatically identifying the present lawn height 104 of the lawn 100. When the method is next carried out, the future lawn height 103 of the lawn 100 is automatically obtained using the lawn growth model based on the identified present lawn height 104.

In detail, the computing unit 60 is configured to store the obtained future lawn height 103 and to compare it, at the point in time for which a lawn height has been obtained, with the then actual present lawn height 104. Furthermore, the computing unit 60 is configured to adapt or improve the lawn growth model based on a comparison result.

Correspondingly, the step ab) comprises storing the identified future lawn height 103, comparing the stored future lawn height 103 with the present lawn height 104 and adapting the lawn growth model based on a comparison result.

In the exemplary embodiment shown, the lawn growth model is already optimized and the present lawn height 104 has been correctly obtained in the past by means of the future lawn height 103 as can be seen on the right in FIG. 2.

For reasons of better clarity, a lawn is not illustrated in the region of the lawn mower robot 40 in FIG. 2. In fact, the unmown lawn in FIG. 2 would have to have the lawn height 103, 104 from right to left as far as the cutting tool 41, and further to the left the mown lawn would have to have the lawn height 106.

Further, the lawn mowing system 10 has an output device 70 in the form of a screen, as can be seen in FIG. 3. The output device 70 is designed to output the adjusted cutting height 42 of the cutting tool 41 and the environmental condition describing parameter 30. The output device 70 is designed to interact with the receiver unit 20, the height adjusting device 50 and the computing unit 60. In the exemplary embodiment shown, the autonomous mobile lawn mower robot 40 comprises the output device 70.

The method correspondingly has a step c): outputting, in particular visual outputting, of the adjusted cutting height 42 and of the environmental condition describing parameter 30.

In addition, the lawn mowing system 10 has an input device 80 in the form of a keypad. The input device 80 is configured to process the adjusted cutting height 42 of the cutting tool 41. In addition, the input device 80 is configured to predefine an average lawn height 105 of the lawn 100. The height adjusting device 50 is configured to adjust the cutting height 42 automatically as a function of the processing and of the predefined average lawn height 105. The input device 80 is configured to interact with the height adjusting device 50, the computing unit 60 and the output device 70. In the exemplary embodiment shown, the autonomous mobile lawn mower robot 40 comprises the input device 80.

In order to achieve the predefined average lawn height 105, the cutting height 42 is adjusted in such a way that the lawn height 106 after the mowing, and the future lawn height 103 up to the next mowing process, yields on average the average lawn height 105 as can be seen in FIG. 2.

The method correspondingly has a step d): enabling the adjusted cutting height 42 of the cutting tool 41 for processing.

Furthermore, the method comprises a step: predefining the average lawn height 105 of the lawn 100. The step b) comprises: automatic adjusting of the cutting height 42 as a function of the predefined average lawn height 105. In the exemplary embodiment shown, the predefined average lawn height 105 is taken into account in step ab) using the lawn growth model, in particular using the computing unit 60.

Moreover, the lawn mowing system 10 has a base station 90 for the autonomous mobile lawn mower robot 40, which base station is arranged here at a boundary edge 101 of the lawn 100, as can be seen top left in FIG. 6. In the exemplary embodiment shown, the base station 90 is embodied as a charging station for re-charging, in particular for the automatic re-charging, of the accumulator of the lawn mower robot 40.

In the exemplary embodiment shown, the base station 90 comprises the receiver unit 20. In alternative exemplary embodiments, the receiver unit can be arranged elsewhere, in particular the autonomous mobile lawn mower robot can comprise the receiver unit. Furthermore, in the exemplary embodiment shown, the base unit 90 comprises the computing unit 60. In alternative exemplary embodiments, the computing unit can be arranged elsewhere, in particular the autonomous mobile lawn mower robot can comprise the computing unit.

The autonomous mobile lawn mower 40 has a wireless and/or cableless robot transmission unit 45. The base station 90 has a wireless and/or cableless base transmission unit 91. The robot transmission unit 45 and the base transmission unit 91 are configured to interact with one another and to transmit data in a wireless fashion. This permits the interaction of the receiver unit 20 and the computing unit 60 with the lawn mower sensor 43, the height adjusting device 50, the output device 70 and the input device 80.

Furthermore, the lawn mowing system 10 has a boundary wire and a power source (not illustrated). The boundary wire surrounds the lawn 100 and defines the boundary edge 101. The power source is configured to allow an electric current to flow through the boundary wire, wherein the electric current can generate a distance-dependent magnetic field in the lawn 100.

The autonomous mobile lawn mower robot 40 has a magnetic field sensor 44. The magnetic field sensor 44 is configured to detect the magnetic field and therefore the boundary edge 101. The lawn mower robot 40 is configured to control its movement on the lawn 100, in particular as a function of detection of the boundary edge 101, in such a way that said lawn mower robot 40 remains on the lawn 100, in particular within the boundary edge 101.

As the exemplary embodiments which are shown and explained above make clear, the invention makes available an advantageous method and an advantageous lawn mowing system, wherein the method and the lawn mowing system have improved properties, in particular more functionalities. In particular, the method and the lawn mowing system permit the cutting height of the cutting tool already to be adjusted as a function of the received prediction before the occurrence of a future environmental condition, and already to take into account and compensate an effect of the future environmental condition on the lawn in the present.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an autonomous mobile lawn mower robot having a cutting tool for mowing a lawn, wherein a cutting height of the cutting tool is adjustable, the method comprising the steps of:
   receiving a prediction of an environmental condition describing parameter,
   automatically adjusting the cutting height of the cutting tool as a function of the received prediction; and
   obtaining a future lawn height of the lawn based on the environmental condition describing parameter using a lawn growth model, wherein
   the step of automatically adjusting the cutting height of the cutting tool as a function of the received prediction further comprises:
      automatically adjusting the cutting height of the cutting tool as a function of the obtained future lawn height.

2. The method according to claim 1, wherein
the environmental condition describing parameter comprises a meteorological parameter.

3. The method according to claim 2, wherein
the meteorological parameter comprises one or more of:
an air temperature, an air humidity, a dew point, an air pressure, an air density, an air composition, a wind direction, a wind velocity, a type of precipitation, an amount of precipitation, a cloudiness, a visibility, a global radiation, an albedo and/or a season of the year.

4. The method according to claim 1, further comprising the step of:
receiving a past value of the environmental condition describing parameter and/or a present value of the environmental condition describing parameter, wherein the step of automatically adjusting the cutting height of the cutting tool as a function of the received prediction further comprises:
automatically adjusting the cutting height of the cutting tool as a function of the received past value and/or of the received present value.

5. The method according to claim 1, further comprising the steps of:
identifying a present lawn height of the lawn; and
obtaining the future lawn height of the lawn using a lawn growth model based on the identified present lawn height.

6. The method according to claim 1, further comprising the step of:
outputting the adjusted cutting height of the cutting tool and/or the environmental condition describing parameter.

7. The method according to claim 1, further comprising the step of:
processing the adjusted cutting height of the cutting tool.

8. The method according to claim 1, further comprising the step of:
mowing the lawn using the autonomous mobile lawn mower robot having its cutting tool adjusted in cutting height.

9. A method for operating an autonomous mobile lawn mower robot having a cutting tool for mowing a lawn, wherein a cutting height of the cutting tool is adjustable, the method comprising the steps of:
receiving a prediction of an environmental condition describing parameter,
automatically adjusting the cutting height of the cutting tool as a function of the received prediction, and
predefining an average lawn height of the lawn, wherein the step of automatically adjusting the cutting height of the cutting tool as a function of the received prediction further comprises:
automatically adjusting the cutting height of the cutting tool as a function of the predefined average lawn height.

10. A lawn mowing system comprising:
a receiver unit, wherein the receiver unit is configured to receive a prediction of an environmental condition describing parameter,
an autonomous mobile lawn mower robot having a cutting tool for mowing a lawn, wherein a cutting height of the cutting tool is adjustable,
a height adjusting device, wherein the height adjusting device is configured to cooperate with the receiver unit and to automatically adjust the cutting height of the cutting tool as a function of the received prediction, and
a computing unit, wherein
the computing unit is configured to obtain a future lawn height of the lawn based on the environmental condition describing parameter using a lawn growth model, and
the height adjusting device is configured to automatically adjust the cutting height of the cutting tool as a function of the obtained future lawn height.

11. The lawn mowing system according to claim 10, further comprising:
an output device, wherein the output device is configured to output the adjusted cutting height of the cutting tool and/or the environmental condition describing parameter.

12. The lawn mowing system according to claim 10, further comprising:
an input device, wherein the input device is configured to process the adjusted cutting height of the cutting tool.

13. The lawn mowing system according to claim 10,
wherein the receiver unit has an interface for connecting the receiver unit to a network.

14. The lawn mowing system according to claim 10, wherein
the cutting height of the cutting tool is adjustable in a range from 0 to 50 cm.

15. The lawn mowing systems according to claim 14, wherein
the cutting height is adjustable to 15 cm.

16. A lawn mowing system comprising:
a receiver unit, wherein the receiver unit is configured to receive a prediction of an environmental condition describing parameter,
an autonomous mobile lawn mower robot having a cutting tool for mowing a lawn, wherein a cutting height of the cutting tool is adjustable,
a height adjusting device, wherein the height adjusting device is configured to cooperate with the receiver unit and to automatically adjust the cutting height of the cutting tool as a function of the received prediction, and
an input device, wherein
the input device is configured to predefine an average lawn height of the lawn, and
the height adjusting device is configured to automatically adjust the cutting height of the cutting tool as a function of the predefined average lawn height.

* * * * *